UNITED STATES PATENT OFFICE.

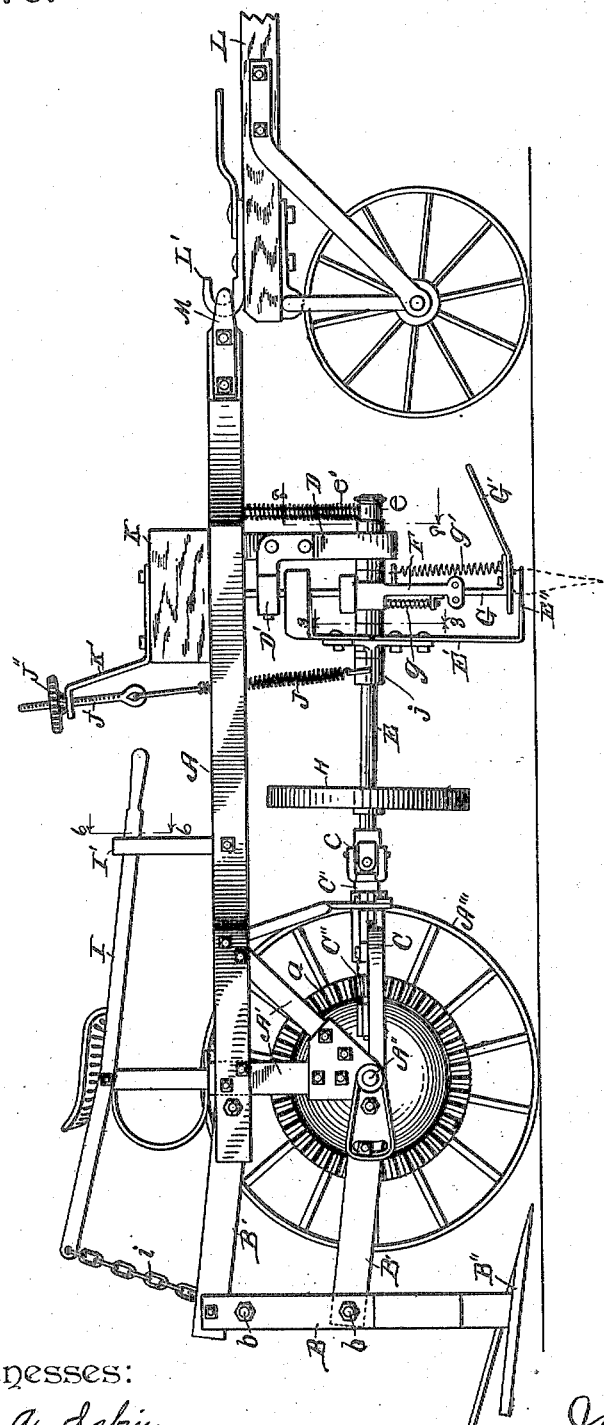

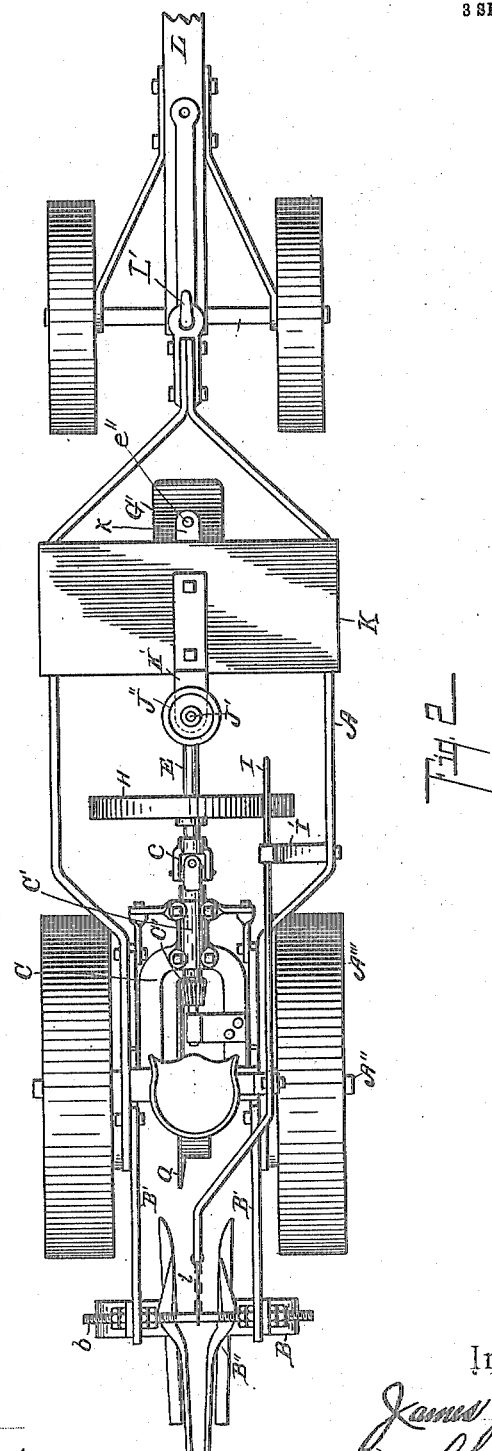

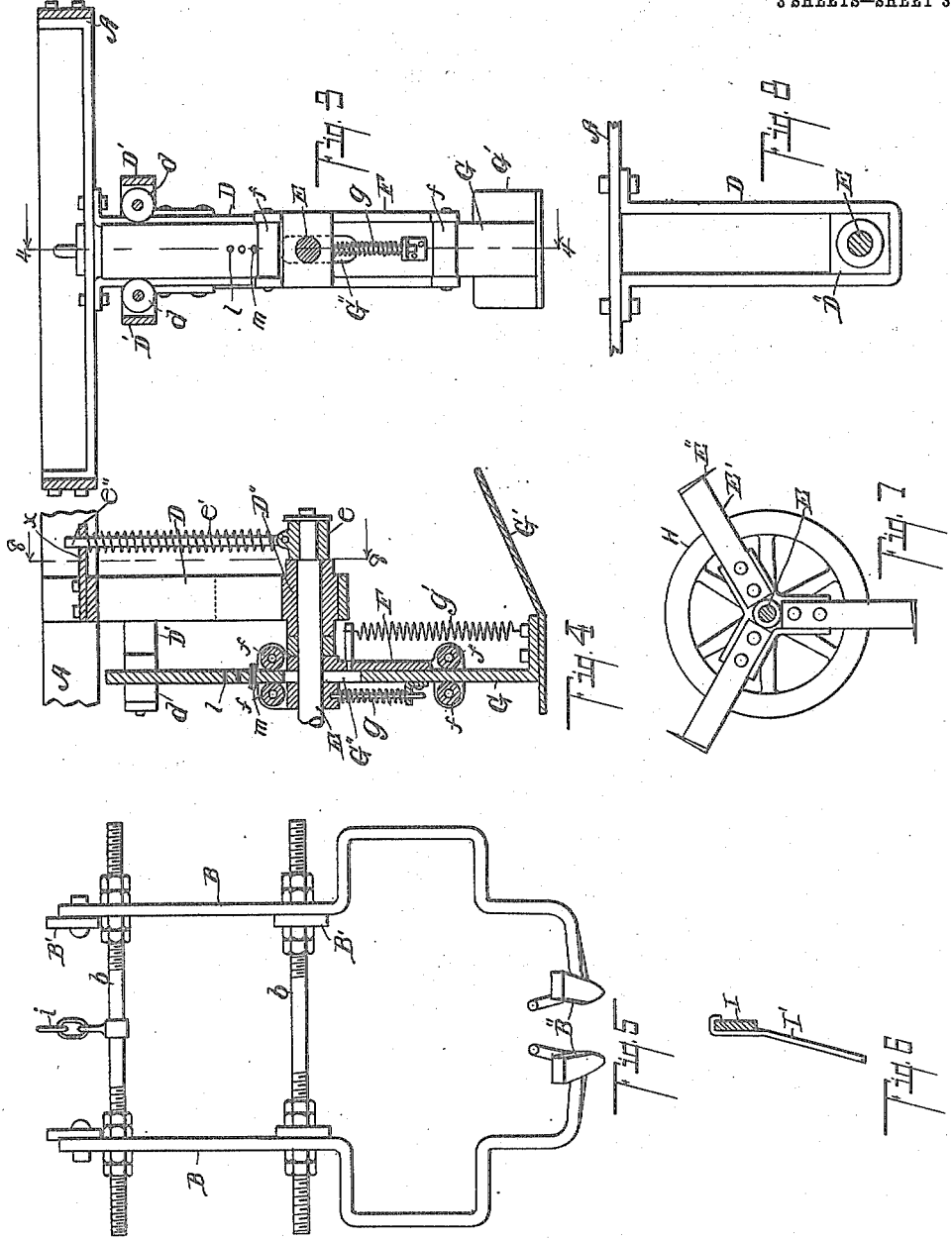

JAMES A. KING, OF THREE RIVERS, MICHIGAN.

BEET-HARVESTER.

951,476.     Specification of Letters Patent.     Patented Mar. 8, 1910.

Application filed April 23, 1906, Serial No. 313,262. Renewed August 2, 1909. Serial No. 510,884.

*To all whom it may concern:*

Be it known that I, JAMES A. KING, a citizen of the United States, residing at Three Rivers, county of St. Joseph, State of Michigan, have invented certain new and useful Improvements in Beet-Harvesters, of which the following is a specification.

This invention relates to improvements in beet harvesting machines.

The objects of this invention are, first, to provide an improved beet harvesting machine which is adapted to automatically adjust itself to remove a larger portion from a large beet or a beet which projects from the ground more than the average to which the machine is adjusted, than it does from the beets to which the machine is adjusted. Second, to provide an improved beet harvesting machine which may be quickly adjusted to remove more or less of the beet top, as may be desired. Third, to provide an improved beet harvesting machine which removes the tops without breaking or shattering the beets. Fourth, to provide an improved beet harvesting machine which is easy to operate and durable in use.

Further objects, and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification.

Figure 1 is a side elevation of my improved beet harvesting machine. Fig. 2 is a plan thereof. Fig. 3 is an enlarged detail vertical section taken on a line corresponding to line 3—3 of Fig. 1, looking toward the front of the machine. Fig. 4 is an enlarged detail vertical section taken on a line corresponding to line 4—4 of Fig. 3. Fig. 5 is a rear elevation of the puller removed from the main frame. Fig. 6 is a detail section taken on a line corresponding to line 6—6 of Fig. 1, showing the means for securing the puller mechanism in its elevated or inoperative position. Fig. 7 is a sectional view taken on a line corresponding to the section line 3—3 of Fig. 1, looking toward the rear of the machine, the shaft E only being sectioned. Fig. 8 is an enlarged detail section taken on a line corresponding to line 8—8 of Fig. 1, showing the means for supporting the bearing D'' for the forward end of the shaft E.

In the drawings the sectional views are taken looking in the direction of the little arrows at the ends of the section lines, and similar letters of reference refer to similar parts throughout the several views.

Referring to the drawings, the main frame A is mounted at its rear end on the axle A'', the frame being provided with downwardly projecting arms A' which are connected to the axle. The forward end of the frame A is pivotally secured to the forward truck, as will be hereinafter described. The wheels A'''' are carrying and driving wheels.

The puller preferably consists of the shovels or plows B'' arranged in pairs, adapted to run in the soil at each side of the row of beets lifting the beets from the ground. These shovels are carried by the standards B which are secured together by the cross-rods *b*. The standards B are pivotally connected by the arms or bars B' to the axle A'' and frame A.

The puller is raised or lowered by means of the lever I which is connected thereto by the chain *i*. A catch I' is provided for holding the puller in its elevated position.

Carried by the axle A'' and the main frame A, is a yoke C having a bearing C' thereon for the rear end of the shaft E. The shaft E is made up of sections which are united by a universal joint as *c*. On the rear section of the shaft E is a gear C'' which is arranged to mesh with the gear *a* which is secured to the axle. The forward section of the shaft E is provided with a suitable bearing D'' which is carried by the yoke D depending from the frame A. The bearing D'' is vertically adjustable in this yoke to permit an up and down movement of the forward end of the shaft.

Carried by the adjustable portion of the shaft E is a casting or bracket F having a vertical opening therethrough to receive the standard G of the shoe G'. Rollers *f*, arranged in pairs above and below the shaft E, are provided for reducing the friction on the standard. The upper end of the standard G is also guided by the rollers *d* which are carried by an arm D' projecting rearwardly from the yoke D. (See Figs. 3 and 4.)

The standard G is provided with a longitudinal slot G'' through which the shaft E is arranged, so that it may move up and down independently thereof. The standard G is also provided with a plurality of holes l through which the pin m is arranged, to limit the downward movement of the standard relative to the shaft. The pin, as the standard is forced downwardly, engages the housing for the upper rollers. By adjusting the pin m, the downward movement of the shoe-carrying standard G relative to the shaft, is regulated.

To hold the shoe-carrying standard normally downward, I provide a coiled compression spring g, one end of which is arranged to bear against the bracket F, and the other against a suitable lug on the standard. To counterbalance in a large measure the weight of the shoe and standard, I provide a spring g', one end of which is connected to the standard and the other to the frame F. These two springs coact and cause the shoe G' to move quite freely.

On the shaft E are radial arms E' having knives E'' thereon. These knives project forwardly from the arms and are arranged to pass under the shoe G' as the shaft is revolved, striking the beet while the same is in engagement therewith.

To insure the steady movement of the shaft and to counteract the shock occasioned by the knife striking into a beet, I provide the shaft with the balance wheel H. The adjustable section of the shaft is carried by the spring J, one end of which is connected to a suitable collar j on the shaft, and the other to a rod J' which is arranged through the bracket K' mounted on a cross-piece K of the frame. The rod J' is threaded and is provided with a hand nut J'' by means of which the tension on the spring J may be regulated.

To prevent the shaft being thrown upward, and also to hold it steadily in position, a spring e' is arranged to act against the spring J, the spring J being of sufficient tension to hold the shaft normally in its lower position. The spring e' is arranged upon the rod e'', the lower end of which is pivotally connected to the collar e on the forward end of the shaft E, the upper end of which is arranged through a bracket x on the main frame.

The main frame A is connected to the forward truck L by means of an eye N which engages the hook L' on the truck. This affords a pivotal connection, allowing great freedom of movement, and also enables disconnecting of the parts for the purpose of storage, etc.

It is a well-known fact that the amount of the beet top removed depends largely upon the size of the beet and the amount thereof projecting above the surface of the ground. The amount of the top removed, as has been stated, is controlled by means of adjusting the stop pin m in the holes l in the shoe standard. When it is desired to remove a larger amount of the beet tops the pin is placed in the lower holes, thereby holding the shoe farther from the knives E''.

It is found in practice, where the beets of uneven size occur in succession in a row, that the shoe G' rises a considerable distance before acting upon the shaft to raise it and thereby elevate the knives, so that approximately the proper portions of the large and small beets are removed. The shoe G' also yields sufficiently to allow the knife to pass readily through the beet, thereby avoiding the danger of bruising or breaking the beet, as would likely occur if the shoe G' were fixed relatively to the knives. The yielding of the shoe also allows the same to pass upon the beets without any danger of bruising or breaking them.

In the event of the shoe meeting an obstacle of sufficient size, as in passing over a very large beet, the same lifts the shaft E upwardly, thereby lifting the knives. The springs J and e hold the shaft so that but little power is required to raise it, and at the same time the counter-acting springs hold the same steadily so that it does not vibrate up and down to an objectionable extent.

While I preferably provide my improved beet harvesting machine with a puller of the form shown and described, I am aware that other constructions of pullers might be used; or the topping portion of the harvester might be used independently of the pulling device. My combined topping and pulling mechanism is, however, very desirable, as the machine can be successfully managed by a single operator, and the power required for operation is such that one team can easily handle the same.

I have illustrated and described my improved harvesting machine in detail in the form preferred by me on account of its structural simplicity and convenience and durability in use; I am, however, aware that it is capable of considerable variation in structural details without departing from my invention.

While I have described the same as a beet harvesting machine, for which purpose it is mainly designed, it is evident that it is adapted for use in harvesting other roots of like nature.

Having thus described my invention, what I claim as new, and desire to secure by Letters Patent, is:—

1. In a root harvesting machine, the combination of a shaft made up of sections connected by a universal joint; a fixed bearing for one of the said shaft sections and an adjustable bearing for the other; a lifting spring connected to the adjustable portion of said shaft; a spring for holding said shaft normally in its lower position, acting against said lifting spring; a shoe; a standard therefor having a longitudinal slot therein through which said shaft is arranged; a guide bracket for said standard carried by said shaft; and radial arms on said shaft having forwardly projecting knives thereon adapted to pass under said shoe as the shaft is revolved, for the purpose specified.

2. In a root harvesting machine, the combination of a shaft made up of sections connected by a universal joint; a fixed bearing for one of the said shaft sections and an adjustable bearing for the other; a shoe; a standard therefor having a longitudinal slot therein through which said shaft is arranged; a guide bracket for said standard carried by said shaft; a lifting spring connected to said guide bracket and shoe standard; a spring arranged to hold said shoe normally in its lower position, acting against said lifting spring; and radial arms on said shaft, having forwardly projecting knives thereon adapted to pass under said shoe as the shaft is revolved, for the purpose specified.

3. In a root harvesting machine, the combination of a shaft made up of sections connected by a universal joint; a fixed bearing for one of the said shaft sections and an adjustable bearing for the other; a shoe; a standard therefor having a longitudinal slot therein through which said shaft is arranged; a guide bracket for said standard carried by said shaft; and radial arms on said shaft having forwardly projecting knives thereon adapted to pass under said shoe as the shaft is revolved, for the purpose specified.

4. In a root harvesting machine, the combination of a yieldingly-supported shaft; a lifting spring connected to said shaft; a spring for holding said shaft normally in its lower position, acting against said lifting spring; a shoe; a support in which said shoe is yieldingly supported, carried by said shaft; and knives carried by said shaft adapted to pass under said shoe as the shaft is revolved, for the purpose specified.

5. In a root harvesting machine, the combination of a yieldingly-supported shaft; a shoe; a support in which said shoe is yieldingly suppported, carried by said shaft; a lifting spring for said shoe; a spring arranged to hold said shoe normally in its lower position, acting against said lifting spring; and knives carried by said shaft adapted to pass under said shoe as the shaft is revolved, for the purpose specified.

6. In a root harvesting machine, the combination of a shaft; a shoe yieldingly supported relative to said shaft; an adjustable stop limiting the downward movement of said shoe; and a knife carried by said shaft, adapted to pass under said shoe as the shaft is revolved, for the purpose specified.

7. In a root harvesting machine, the combination of a shaft; a shoe yieldingly supported relative to said shaft; and a knife carried by said shaft, adapted to pass under said shoe as the shaft is revolved, for the purpose specified.

8. The combination with the main frame, of an axle; a carrying and driving wheel; a gear on said axle; a shaft made up of sections connected by a universal joint; a fixed bearing for the rear section of said shaft; a gear on the rear section of said shaft, arranged to mesh with the gear on the said axle; a vertically adjustable bearing for the forward section of said shaft; a shoe yieldingly supported relative to said shaft; and a knife carried by said shaft adapted to pass under said shoe as the shaft is revolved.

In testimony whereof, I have hereunto set my hand and seal in the presence of two witnesses.

JAMES A. KING. [L. S.]

Witnesses:
E. O. LINSEY,
A. H. BANKER.